US006858569B2

(12) United States Patent
Yokota et al.

(10) Patent No.: US 6,858,569 B2
(45) Date of Patent: Feb. 22, 2005

(54) CUTTING OR GRINDING OIL COMPOSITION

(75) Inventors: Hideo Yokota, Yokohama (JP); Noboru Aota, Tokyo (JP); Yoshitaka Natsume, Kashiwazaki (JP); Masanori Ibi, Niigata (JP); Minoru Okajima, Tokyo (JP); Ichiro Inezaki, Yokosuka (JP); Toshiaki Wakabayashi, Kagawa (JP); Satoshi Suda, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/891,486

(22) Filed: Jun. 25, 2001

(65) Prior Publication Data

US 2002/0035043 A1 Mar. 21, 2002

Related U.S. Application Data

(63) Continuation of application No. PCT/JP00/06978, filed on Oct. 6, 2000.

(30) Foreign Application Priority Data

Oct. 25, 1999 (JP) ............................................. 11-302504

(51) Int. Cl.$^7$ ............................................. C10M 105/38
(52) U.S. Cl. ....................... 508/485; 508/495; 508/584; 72/42

(58) Field of Search .......................................... 508/485

(56) References Cited

U.S. PATENT DOCUMENTS

| | | | | | |
|---|---|---|---|---|---|
| 3,805,918 | A | * | 4/1974 | Altgelt et al. ................... | 184/1 |
| 4,477,383 | A | * | 10/1984 | Beimesch et al. ........ | 260/410.6 |
| 4,589,990 | A | * | 5/1986 | Zehler et al. .................. | 252/56 |
| 4,601,840 | A | * | 7/1986 | Zehler et al. ................ | 508/485 |
| 4,655,947 | A | * | 4/1987 | Tsai et al. .................... | 508/485 |
| 4,812,248 | A | * | 3/1989 | Marwick ..................... | 508/485 |
| 5,171,903 | A | * | 12/1992 | Koyama et al. ................ | 585/3 |
| 5,226,506 | A | * | 7/1993 | Link .......................... | 184/6.26 |
| 5,493,886 | A | * | 2/1996 | Graham ......................... | 72/42 |
| 5,756,430 | A | * | 5/1998 | Zielinski ..................... | 508/275 |
| 5,877,130 | A | | 3/1999 | Kohara et al. | |
| 5,895,778 | A | * | 4/1999 | McHenry et al. ........... | 508/495 |
| 6,085,782 | A | * | 7/2000 | Ott .............................. | 137/580 |
| 6,245,723 | B1 | * | 6/2001 | Sigg et al. ................... | 508/315 |
| 6,300,293 | B1 | * | 10/2001 | Lamberth ................... | 508/436 |
| 6,326,338 | B1 | * | 12/2001 | Garrett ....................... | 508/589 |

* cited by examiner

*Primary Examiner*—Ellen M McAvoy
(74) *Attorney, Agent, or Firm*—Akin Gump Strauss Hauer & Feld LLP

(57) ABSTRACT

Cutting or grinding oil compositions which are suitable for use in a minimal quantity lubrication system in which a minimal quantity of an oil is supplied to the spot to be cut or ground of a work, together with air are reduced in stickiness and improved in lubricity.

19 Claims, No Drawings

CUTTING OR GRINDING OIL COMPOSITION

CROSS-REFERENCE TO RELATED APPLICATION

This application is a continuation of International Application No. PCT/JP00/06978, filed Oct. 6, 2000.

FIELD OF THE INVENTION

The present invention relates to cutting or grinding oil compositions suitable for use in a minimal quantity lubrication system in which a minimal quantity of the oil is supplied to a spot of a metal piece to be cut or ground, together with a compressed fluid.

BACKGROUND OF THE INVENTION

Various cutting or grinding oils are generally used in metal working processes for the purpose of lengthening the life of working tools, such as drills, millings, tools, and grinders, improving the roughness of the finished surface of a work, and improving working efficiency thereby, resulting in the increasing the productivity of machining.

Cutting or grinding oils are roughly classified into water-soluble ones which are put in use after diluting the surface-active agent and lubricant component contained therein with water, and water-insoluble ones which contain a mineral oil as a main component and are used as it is, i.e., in the form of a stock solution. In conventional cutting and grinding operations, relatively large amounts of cutting or grinding oil are supplied to a spot of the metal piece to be worked.

The most basic and important functions of cutting oils and grinding oils are lubricating and cooling properties. Generally speaking, water-insoluble cutting and grinding oils are superior in lubricating properties, while water-soluble ones are superior in cooling properties. Since the cooling properties of the water-insoluble cutting and grinding oils are inferior to that of the water-soluble ones, it is necessary to supply large amounts, ranging from several liters to over ten liters of the water-insoluble cutting or grinding oil.

Cutting oils and grinding oils which are effective for improving working efficiency have undesirable aspects, when viewing from the different side. The typical examples of such aspects are problems concerning with the environment. Regardless of whether an oil is water-soluble or water-insoluble, it is gradually deteriorated during the use thereof and finally becomes incapable of further use. For instance, a water-soluble oil is unable to be used when it undergoes the separation of the components or deteriorates the environment in terms of sanitary, caused by deteriorated stability due to the growth of microorganisms. A water-insoluble oil becomes incapable when the acid components generated with the progress of oxidation make the metal piece corrode, or the viscosity is significantly changed. Furthermore, the oil is spent by adhering to metal chips or swarf and becomes wastes.

In such a case, the deteriorated oil is disposed and then replaced with a fresh oil. The oil disposed as wastes is necessarily subjected to various treatments so as not to adversely affect the environment. For instance, cutting or grinding oils which are developed, giving an improvement in working efficiency priority, contain a large amount of chlorine-containing components which may generate dioxin upon incineration. Therefore, the removal of such components is required. For the reason of this, there have been developed cutting or grinding oils which are free of chlorine-containing components. However, even though the oils contain no chlorine-based components, there arise environmental problems, resulting from disposal of large quantities of wastes. The water-soluble oils may pollute the surrounding water area, and are therefore necessarily subjected to highly-developed treatments at increased costs.

In order to deal with the foregoing problems, it has been studied to cool a metal piece by blowing a cold air instead of using cutting or grinding oils. In such a case, the other ability of cutting and grinding oils, i.e., lubricity can not be obtained.

In order to overcome such a problem, there has been developed a system in which an oil in a minimal quantity, which is within the range of about 1/100,000 to 1/1,000,000 of the normal quantity, is supplied to a cutting or grinding spot of a work, together with a compressed fluid, such as compressed air. This system can obtain a cooling effect with compressed air and can reduce the amount of wastes due to the use of a minimal quantity of oil, resulting in the reduction of the influences on the environment, accompanied with large amounts of waste disposal. However, there has not been proposed a cutting or grinding oil having the properties required for cutting or grinding using the minimal quantity lubrication system, more specifically a cutting or grinding oil having high performances which make it possible to provide a worked product with a smooth surface, even though by the use thereof in a minimal quantity, reduce the wear of tools, and perform cutting and grinding efficiently. The development of such a cutting or grinding oil has been demanded. In the minimal quantity lubrication system, the oil is supplied in the form of mist. Therefore, the system involves a problem that the oil easily adheres to the interior of a working machine, a workpiece, the inside of a mist collector and the like. If the adhered oil becomes sticky easily, the treatability thereof is hindered, leading to reduced working efficiency. Therefore, the oils for the minimal quantity lubrication system is desirously hard to be sticky.

SUMMARY OF THE INVENTION

In view of the foregoings, the object of the present invention is to provide a cutting or grinding oil composition suitable for use in a minimal quantity lubrication system in which the oil in a minimal quantity is supplied to a cutting or grinding spot of a work, together with a compressed fluid such that the amount of the oil to be disposed as wastes is significantly reduced. Particularly, the object of the present invention is to provide an oil composition which is hard to become sticky and exhibits excellent lubricating properties such that cutting or grinding can be operated efficiently.

As a result of an extensive research, it has been found that the use of a cutting or grinding oil composition containing an ester as a base oil for a minimal quantity lubrication system is effective in workability upon cutting or grinding and in improvement of the finished surface of a work. Furthermore, it has been discovered that the use of an ester having specific characteristics is effective in improvement of the oil in terms of the stickiness to tools which is liable to occur when it is supplied in the form of mist and in terms of lubricating properties. It is also found that an oil further containing oiliness improvers and oxidation inhibitors in addition to the ester present as a base oil, can be improved in lubricating properties and stickiness.

According to the present invention, there is provided a cutting or grinding oil composition containing an ester as a base oil for use in a minimal quantity lubrication system.

DETAILED DESCRIPTION OF THE INVENTION

The details of the present invention is described hereinbelow.

The present invention provides a cutting or grinding oil composition for a minimal quantity lubrication system. The term "minimal quantity lubrication system" used herein denotes working operations by cutting or grinding which are conducted while supplying an oil in a minimal quantity, such as 1/100,000 to 1/1,000,000 of the quantity of an oil used for a normal cutting or grinding operation, together with a compressed fluid. More specifically, in the minimal quantity lubrication system, an oil in a minimal quantity ranging from 0.001 ml/minute to 1 ml/minute is supplied to a cutting or grinding spot of a workpiece, together with a compressed fluid, such as compressed air. Other than compressed air, there may be used a compressed fluid, such as nitrogen, argon, helium, carbon dioxide, and water and mixed fluids thereof.

The pressure of the compressed fluid in the nominal quantity lubrication system is adjusted such that scattered oil does not pollutes the atmosphere and a mixed fluid of an oil and a gas or liquid can sufficiently reach a cutting or grinding spot of a work. The temperature of the compressed fluid is adjusted so as to be in the range of room temperature (25° C.) to −50° C.

The following describes an ester used as a base oil of the cutting or grinding oil composition for a nominal quantity lubrication system (hereinafter referred to as "oil composition" or "oil").

An ester used as a base oil may be a natural ester such as one contained in plant or animal fats and oils or a synthetic one. In the present invention, synthetic esters are preferred because of the stability of the resulting oil composition and the uniformity of the ester component.

An alcohol constituting the ester used as a base oil may be a monohydric- or polyhydric-alcohol. An acid constituting the ester may be a monobasic- or polybasic-acid. The monohydric alcohol may be one having 1 to 24, preferably 1 to 12, and more preferably 1 to 8 carbon atoms and may be of straight-chain or branched and saturated or unsaturated. Specific examples of the alcohol having 1 to 24 carbon atoms are methanol, ethanol, straight-chain or branched propanol, straight-chain or branched butanol, straight-chain or branched pentanol, straight-chain or branched hexanol, straight-chain or branched heptanol, straight-chain or branched octanol, straight-chain or branched nonanol, straight-chain or branched decanol, straight-chain or branched undecanol, straight-chain or branched dodecanol, straight-chain or branched tridecanol, straight-chain or branched tetradecanol, straight-chain or branched pentadecanol, straight-chain or branched hexadecanol, straight-chain or branched heptadecanol, straight-chain or branched octadecanol, straight-chain or branched nonadecanol, straight-chain or branched eicosanol, straight-chain or branched heneicosanol, straight-chain or branched tricosanol, straight-chain or branched tetracosanol, and mixtures thereof.

Examples of the polyhydric alcohol which may be used in the present invention are those of from hihydric to decahydric, preferably from dihydric alcohols to hexahydric. Specific examples of such alcohols are dihydric alcohols such as ethylene glycol, diethylene glycol, polyethylene glycol (trimers through pentadecamers of ethylene glycol), propylene glycol, dipropylene glycol, polypropylene glycol (trimers through pentadecamers of propylene glycol), 1,3-propane diol, 1,2-propane diol, 1,3-butane diol, 1,4-butane diol, 2-methyl-1,2-propane diol, 2-methyl-1,3-propane diol, 1,2-pentane diol, 1,3-pentane diol, 1,4-pentane diol, 1,5-pentane diol, and neopentyl glycol; polyhydric alcohols such as glycerin, polyglycerin (dimers through octamers of glycerine, such as diglycerine, triglycerine, and tetraglycerin), trimethylolalkane (trimethylolethane, trimethylolpropane, and trimethylolbutane), and dimers through tetramers thereof, pentaerythritol and dimers through tetramers thereof, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylytol, and mannitol; and saccharides such as xylose, arabinose, ribose, rhamnose, glucose, fructose, galactose, mannose, sorbose, cellobiose, maltose, isomaltose, trehalose, and sucrose; and mixtures thereof.

Among these, preferred are dihydric- to hexahydric-alcohols such as ethylene glycol, diethylene glycol, polyethylene glycol (trimers through decamers of ethylene glycol), propylene glycol, dipropylene glycol, polypropylene glycol (trimers through decamers of propylene glycol), 1,3-propane diol, 2-methyl-1,2-propane diol, 2-methyl-1,3-propane diol, neopentyl glycol, glycerin, diglycerin, triglycerin, trimethylolalkane (trimethylolethane, trimethylolpropane, and trimethylolbutane) and dimers through tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylytol, and mannitol, and mitures thereof. More preferred are ethylene glycol, propylene glycol, neopentyl glycol, glycerin, trimethylol ethane, trimethylol propane, pentaerythritol, sorbitan, and mixtures thereof.

As mentioned above, an alcohol constituting the ester used as a base oil may be a monohydric- or polyhydric-alcohol but is preferably a polyhydric alcohol because it can provide excellent lubricating properties for cutting or grinding operation, improve the precision of the finished surface and the ability to prevent the tools from wearing, and the resulting oil is low in pour point and improved in treatability during winter season and in cold districts.

The monobasic acid to be used in the present invention has 2 to 24 carbon atoms and may be straight-chain or branched and saturated or unsaturated. Specific examples of the monobasic acid are saturated fatty acids such as acetic acid, propionic acid, straight-chain or branched butanoic acid, straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched hydroxyoctadecanoic acid, straight-chain or branched nonadecanoic acid, straight-chain or branched eicosanoic acid, straight-chain or branched heneicosanoic acid, straight-chain or branched docosanoic acid, straight-chain or branched tricosanoic acid, and straight-chain or branched tetracosanoic acid; unsaturated fatty acids, such as acrylic acid, straight-chain or branched butenoic acid, straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, straight-chain or branched octadecenoic acid, straight-chain or branched hydroxyoctadecenoic acid, straight-chain or branched nonadecenoic acid, straight-chain or branched eicosenic acid, straight-chain or branched heneicosenic acid, straight-chain or branched docosenoic acid, straight-chain or branched tricosenic acid, and straight-chain or branched tetracosenoic acid; and mixtures thereof. Among these, preferred are saturated fatty acids having 3 to 20 carbon atoms, unsaturated fatty acids having 3 to 22 carbon atoms, and mixtures thereof because they can provide excellent lubricating properties, and increase the precision of the finished surface and the effect to prevent tools from wearing. More preferred are saturated fatty acids having 4 to 18 carbon atoms, unsaturated fatty acids having 4 to 18 carbon atoms, and mixtures thereof.

Examples of the polybasic acid which may be used in the present invention are dibasic acids having 2 to 16 carbon atoms, and trimellitic acid. The dibasic acids having 2 to 16 carbon atoms may be straight-chain or branched and saturated and unsaturated. Specific examples of the dibasic acids are ethanoic dibasic acid, propanoic dibasic acid, straight-chain or branched butanoic dibasic acid, straight-chain or branched pentanoic dibasic acid, straight-chain or branched hexanoic dibasic acid, straight-chain or branched heptanoic dibasic acid, straight-chain or branched octanoic dibasic acid, straight-chain or branched nonanoic dibasic acid, straight-chain or branched decanoic dibasic acid, straight-chain or branched undecanoic dibasic acid, straight-chain or branched dodecanoic dibasic acid, straight-chain or branched tridecanoic dibasic acid, straight-chain or branched tetradecanoic dibasic acid, straight-chain or branched heptadecanoic dibasic acid, straight-chain or branched hexadecanoic dibasic acid, straight-chain or branched hexenoic dibasic acid, straight-chain or branched heptenoic dibasic acid, straight-chain or branched otcenoic dibasic acid, straight-chain or branched nonenoic dibasic acid, straight-chain or branched decenoic dibasic acid, straight-chain or branched undecenoic dibasic acid, straight-chain or branched dodecenoic dibasic acid, straight-chain or branched tridecenoic dibasic acid, straight-chain or branched tetradecenoic dibasic acid, straight-chain or branched heptadecenoic dibasic acid, and straight-chain or branched hexadecenoic dibasic acid; and mixtures thereof.

As described above, an acid constituting the ester present as a base oil may be a monobasic acid or a polybasic acid. However, preferred are monobasic acids because the resulting oil composition is increased in viscosity index and can be easily formed into mist and exhibit excellent lubricating properties.

No particular limitation is imposed on the combination of an alcohol and an acid forming an ester used as a base oil of the oil composition of the present invention. Examples of the combination are as follows:

(1) an ester of a monohydric alcohol and a monobasic acid;
(2) an ester of a polyhydric alcohol and a monobasic acid;
(3) an ester of a monohydric alcohol and a polybasic acid;
(4) an ester of a polyhydric alcohol and a polybasic acid;
(5) a mixed ester of a mixture of a monohydric alcohol and a polyhydric alcohol and a polybasic acid;
(6) a mixed ester of a polyhydric alcohol, and a mixture of a monobasic acid, and a polybasic acid; and
(7) a mixed ester of a mixture of a monohydric alcohol and a polyhydric alcohol, and a monobasic acid and a polybasic acid.

Among these combinations, preferred is (2) an ester of a polyhydric alcohol and a monobasic acid because the use of such an ester is contributive to the production of an oil composition which is improved in lubricating properties for cutting or grinding, in the precision of the finished surface of a worked metal piece, in an ability to prevent tools from wearing, in treatability during winter season and in cold districts, and in an ability to be formed into mist, is reduced in pour point, and is enhanced in viscosity index.

Natural fats and oils which may be used in the present invention are vegetable oils such as palm oil, palm kernel oil, rape oil, soybean oil, high-oleic rape oil, and high-oleic sunflower oil, and animal oils such as lard.

In the case of using a polyhydric alcohol, the resulting ester may be a full ester all of which the hydroxyl groups have been esterified, or a partial ester part of which hydroxyl groups remain unesterified. In the case of using a polybasic acid, the resulting organic ester may be a full ester all of which the carboxyl groups have been esterified, or a partial ester part of which carboxyl groups remain unesterified.

Although an oil composition with improved lubricating properties can be obtained by using the ester described above as a base oil, it is preferred to use an ester having a hydroxyl value of 0.01 to 300 mgKOH/g in order to further enhance lubricating properties. In order to obtain an oil with further enhanced lubricity, the upper limit hydroxyl value is preferably 200 mgKOH/g, and the most preferably 150 mgKOH/g, while the lower limit is 0.1 mgKOH/g, preferably 0.5 mgKOH/g, more preferably 1 mgKOH/g, further more preferably 3 mgKOH/g, and the most preferably 5 mgKOH/g. The term "hydroxyl value of an ester" used herein denotes a value measured by the indicator titration method defined by JIS K 0070 "a method of measuring acid value, saponification value, ester value, iodine value, hydroxyl value, and unsaponifiable matter of chemical products".

No particular limitation is imposed on a method for preparing an ester for the present invention having a hydroxyl value within the range of 0.01 to 300 mgKOH/g. For instance, such an ester may be prepared by adjusting the selection of the raw materials and the reaction conditions, during the preparation of an ester, or by mixing two or more esters having different hydroxyl values. In the case of employing the latter method, an ester having a relatively low hydroxyl value is used in combination with an ester having a relatively high hydroxyl value. More specifically, an ester having a hydroxyl value of 0 to 150 mgKOH/g, preferably 0 to 100 mgKOH/g, more preferably 0 to 50 mgKOH/g, and most preferably 0 to 20 mgKOH/g is used in combination with an ester having a hydroxyl value in excess of 150 mgKOH/g and 500 mgKOH/g or lower, preferably from 200 to 400 mgKOH/g, and most preferably 250 to 350 mgKOH/g. The former ester is used in an amount of 50 to 99.9 percent by mass, preferably 70 to 99.5 percent by mass, and most preferably 80 to 99 percent by mass, based on the total mass, while the latter ester is used in an amount of 0.1 to 50 percent by mass, preferably 0.5 to 30 percent by mass, and most preferably 1 to 20 percent by mass, based on the total mass. In the case where the oil composition is made up two or more esters, the ester having a relatively low hydroxyl value acts as a base oil, and the ester having a relatively high hydroxyl value acts as an additive. However, in the present invention, these esters in combination is used as a base oil.

With the objective of further enhancing the lubricating properties of the oil composition, the saponification value of thereof is preferably within the range of 100 to 500 mgKOH/g. The upper limit saponification value is preferably 400 mgKOH/g, while the lower limit is 200 mgKOH/g. The term "saponification value" used herein denotes a value measured by the indicator titration method defined by JIS K 2503 "Testing method of lubricating oil for aircraft".

The oil composition with excellent lubricating properties is preferably hard to be sticky. Accordingly, it is preferred to used an ester having an iodine value of 0 to 80 and/or a bromine value of 0 to 50 g $BR_2/100$ g.

The iodine value of the ester is within the range of 0 to 60, preferably 0 to 40, more preferably 0 to 20, and most preferably 0 to 10.

The bromine value of the ester is preferably within the range of 0 to 30 g $BR_2/100$ g, and most preferably 0 to 10 g $BR_2/100$ g. The term "iodine value" used herein denotes measured by the indicator titration method defined by JIS K 0070 "a method of measuring acid value, saponification value, ester value, iodine value, hydroxyl value, and unsaponifiable matter of chemical products". The term "bromine value" used herein denotes a value measured in accordance with JIS K 2605 "Petroleum distillates and commercial aliphatic olefins-Determination of bromine number-Electrometric method".

Although not restricted, the upper limit of kinematic viscosity at 40° C. of the ester used as a base oil is 200 $mm^2/s$, preferably 100 $mm^2/s$, more preferably 75 $mm^2/s$, and most preferably 50 $mm^2/s$ because the ester can be easily supplied to a spot of a metal piece to be worked. The lower limit kinematic viscosity at 40° C. is preferably 1 $mm^2/s$, more preferably 3 $mm^2/s$, and most preferably 5 $mm^2/s$.

Although not restricted, the pour point of the ester is preferably −20° C. or below, and more preferably −45° C. or below. The viscosity index of the ester is preferably 100 or more and 200 or less.

No particular limitation is imposed on the content of the ester contained as a base oil of the oil composition of the present invention. However, the ester content is 10 percent by mass or more, preferably 20 percent by mass or more, more preferably 30 percent by mass or more, and most preferably 50 percent by mass or more, based on the total mass of the composition with the objective of biodegradability, that is, the easy decomposition of the oil components with microorganisms such as bacteria such that the environment of the surroundings can be maintained.

In addition to the above-described ester, the oil composition according to the present invention contains preferably oiliness improvers. The addition of oiliness improvers can enhance the lubricating properties of the oil. Examples of the oiliness improvers are (A) alcohols, (B) carboxylic acids, (C) sulfides of unsaturated carboxylic acids, (D) compounds represented by formula (1) below, (E) compounds represented by formula (2) below, (F) polyoxyalkylene compounds, and (G) esters. The oiliness improvers will be described hereinafter, respectively.

Alcohols (A) may be monohydric- or polyhydric-alcohols. Preferred are monohydric alcohols having 1 to 40 carbon atoms, preferably 1 to 25 carbon atoms, and most preferably 8 to 18 carbon atoms because the resulting oil composition would have enhanced lubricating properties and excellent workability. Specific examples of such monohydric alcohols are those already exemplified with respect to alcohols forming the ester used as a base oil. These alcohols may be straight-chain or branched and saturated or unsaturated. However, saturated alcohols are preferred with the objective of less stickiness.

Carboxylic acids (B) may be monobasic- or polybasic-acids. Preferred are monocarboxylic acids having 1 to 40 carbon atoms, more preferred are those having 5 to 25 carbon atoms, and the most preferred are those having 5 to 20 carbon atoms because the resulting oil composition would have enhanced lubricating properties and excellent workability. Specific examples of such monocarboxylic acids are those already exemplified with respect to carboxylic acids forming the ester used as a base oil. These carboxylic acids may be straight-chain or branched and saturated or unsaturated. However, saturated alcohols are preferred in view of stickiness.

Sulfides of unsaturated carboxylic acids (C) are sulfides of unsaturated one selected from carboxylic acids (B). Specific examples are sulfides of oleic acid.

Compounds (D) is represented by the formula

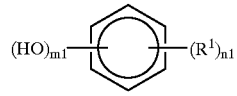

(1)

wherein $R^1$ is a hydrocarbon group having 1 to 30 carbon atoms, m1 is an integer from 1 to 6, and n1 is an integer from 0 to 5.

Examples of the hydrocarbon group having 1 to 30 carbon atoms are straight-chain or branched alkyl groups having 1 to 30 carbon atoms, cycloalkyl groups having 5 to 7 carbon atoms, alkylcycloalkyl groups having 6 to 30 carbon atoms, straight-chain or branched alkenyl groups having 2 to 30 carbon atoms, aryl groups having 6 to 10 carbon atoms, alkylaryl groups having 7 to 30 carbon atoms, and arylalkyl groups having 7 to 30 carbon atoms. Among these, $R^1$ is preferably a straight-chain or branched alkyl group having 1 to 30 carbon atoms, more preferably a straight-chain or branched alkyl group having 1 to 20 carbon atoms, further more preferably a straight-chain or branched alkyl group having 1 to 10 carbon atoms, and most preferably a straight-chain or branched alkyl group having 1 to 4 carbon atoms. Specific examples of the straight-chain or branched alkyl group having 1 to 4 carbon atoms are methyl, ethyl, straight-chain or branched propyl, and straight-chain or branched butyl.

No particular limitation is imposed on the position of the hydroxyl group(s). However, in the case where the compound has two or more hydroxyl groups, they are preferably substituted at adjacent carbon atoms. m1 is an integer preferably from of 1 to 3, and more preferably 2. n1 is an integer preferably from 0 to 3, and more preferably 1 or 2. Example of the compound of formula (1) is p-tert-butylcatechol.

Compounds (E) is represented by the formula

(2)

wherein $R^2$ is a hydrocarbon group having 1 to 30 carbon atoms, m2 is an integer from 1 to 6, and n2 is an integer form 0 to 5.

Examples of the hydrocarbon group having 1 to 30 carbon atoms for $R^2$ are those already exemplified with respect to $R^1$ in formula (1). Therefore, preferred examples are the same as those for $R^1$. No particular limitation is imposed on the position of the hydroxyl group(s). However, in the case where the compound has two or more hydroxyl groups, they are preferably substituted at adjacent carbon atoms. m2 is an integer preferably from 1 to 3, and more preferably 2. n2 is an integer preferably from 0 to 3, and more preferably 1 or 2. Examples of the compound of formula (2) are 2,2-dihydroxynaphthalene, and 2,3-dihydroxynaphthalene.

Polyoxyalkylene compounds (F) are exemplified by compounds represented by the formulae $$R^3O-(R^4O)_{m3}-R^5 \quad (3)$$

wherein $R^3$ and $R^5$ are each independently a hydrogen or a hydrocarbon group having 1 to 30 carbon atoms, $R^4$ is an alkylene group having 2 to 4 carbon atoms, and m3 is an integer selected so as to provide the number-average molecular weight of from 100 to 3,500; and $$A-[(R^6O)_{n4}-R^7]_{m4} \quad (4)$$

wherein A is a residue resulting from the removal of all or part of the hydrogen atoms of the hydroxyl groups of a polyhydric alcohol having 3 to 10 hydroxyl groups, $R^6$ is an alkylene group having 2 to 4 carbon atoms, $R^7$ is a hydrogen or a hydrocarbon group having 1 to 30 carbon atoms, n4 is an integer selected so as to provide the number-average molecular weight of from 100 to 3,500, and m4 indicates the same number as that of the removed hydrogen.

Further explanation will be given to formula (3).

At least either one of $R^3$ or $R^5$ is preferably hydrogen. Examples of hydrocarbon groups having 1 to 30 carbon atoms for $R^3$ and $R^5$ are those already exemplified with respect to $R^1$ and thus preferred examples are the same as those for $R^1$. Specific examples of the alkylene group having 2 to 4 carbon atoms for $R^4$ are ethylene, propylene (methylethylene), and butylene (ethylethylene).

m3 is an interger selected so as to provide the number-average molecular weight of from 300 to 2,000, preferably 500 to 1,500.

Further explanation will be given to formula (4).

Specific examples of the polyhydric alcohol having 3 to 10 hydroxyl groups forming the residue A are polyhydric alcohols such as glycerin, polyglycerin (dimers through tetramers of glycerin, such as diglycerin, triglycerin, and tetraglycerin), trimethylolalkanes (trimethylolethane, trimethylolpropane, trimethylolbutane) and dimers through tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylitol, mannitol, iditol, talitol, dulcitol, and allitol; and saccharides such as xylose, arabinose, ribose, rhamnose, glucose, fructose, galactose, mannose, sorbose, cellobiose, maltose, isomaltose, trehalose, and sucrose. Among these, preferred are glycerin, polyglycerin, trimethylolalkanes and dimers through tetramers thereof, pentaerythritol, dipentaerythritol, sorbitol, and sorbitan.

Examples of the alkylene group having 2 to 4 carbon atoms for $R^6$ are those already exemplified with respect to $R^4$. Examples of the hydrocarbon group having 1 to 30 carbon atoms for $R^7$ are those already exemplified with respect to $R^1$ and thus preferred examples are the same as those for $R^1$. Preferably, at least one of the $R^7$ groups the number of which is expressed by m4 is preferably a hydrogen, and more preferably all of the $R^7$ groups are hydrogens. n4 is an integer selected so as to provide the number-average molecular weight of from 300 to 2,000, and more preferably from 500 to 1,500.

Esters (G) may be any of those made from an alcohol which may either a monohydric- or polyhydric alcohol, and a carboxylic acid which may be either a monobasic or polybasic acid.

Examples of the monohydric and polyhydric alcohols are those already exemplified with respect to the ester used as a base oil. Therefore, preferred examples are also as exemplified with respect to the ester used as a base oil. Examples of the monobasic- and polybasic-acids are those as described with respect to the ester used as a base oil. Preferred examples are as exemplified with respect to the ester used as a base oil.

No particular limitation is imposed on the combination of alcohols and carboxylic acids. For instance, the combination may be as follows:

(1) an ester of a monohydric alcohol and a monobasic acid;
(2) an ester of a polyhydric alcohol and a monobasic acid;
(3) an ester of a monohydric alcohol and a polybasic acid;
(4) an ester of a polyhydric alcohol and a polybasic acid;
(5) a mixed ester of a mixture of a monohydric alcohol and a polyhydric alcohol, and a polybasic acid;
(6) a mixed ester of a polyhydric alcohol, and a mixture of a monobasic acid and a polybasic acid; and
(7) a mixed ester of a mixture of a monohydric alcohol and a polyhydric alcohol, a monobasic acid, and a polybasic acid.

In the case of using a polyhydric alcohol, the resulting ester may be a full ester all of which the hydroxyl groups have been esterified, or a partial ester part of which hydroxyl groups remain unesterified. In the case of using a polybasic acid, the resulting organic ester may be a full ester all of which the carboxyl groups have been esterified, or a partial ester part of which carboxyl groups remain unesterified.

No particular limitation is imposed on the total carbon number of esters contained as oiliness improvers. However, in order to obtain enhanced lubricating properties and workability, the ester has preferably 7 or more, more preferably 9 or more, and most preferably 11 or more carbon atoms. In order to suppress the increase of stain and occurrence of corrosion, the ester has preferably 26 or less, more preferably 24 or less, and most preferably 22 or less.

Only one of the above-described oiliness improvers may be used. Alternatively, two or more of those may be used in combination.

No particular limitation is imposed on the content of the oiliness improvers in the oil composition. However, in order to obtain enhanced lubricating properties and workability, the total content of oiliness improvers is preferably 0.1 percent by mass or more, more preferably 0.2 percent by mass or more, and most preferably 0.5 percent by mass or more, based on the total mass of the oil composition. In order to suppress the increase of stain and occurrence of corrosion, the upper limit content of the oiliness improvers is preferably 50 percent by mass or less, more preferably 30 percent by mass or less, and even more preferably 20 percent by mass or less, and most preferably 15 percent by mass or less.

Preferably, the oil composition according to the present invention contains oxidation inhibitors. The addition of oxidation inhibitors can suppress the stickiness caused by the deterioration of the oil. Eligible oxidation inhibitors are those which have been used for a lubricant or as a food additive, such as 2,6-di-tert-butyl-p-cresol (DBPC), 4,4'-methylenebis(2,6-di-tert-butylphenol), 4,4'-bis(2,6-di-tert-butylphenol), 4,4'-thiobis(6-tert-butyl-o-cresol), L-ascoribic acid (vitamin C), fatty acid ester of L-ascoribic acid, tocopherol (vitamin E), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediole (TBHQ), and 2,4,5-trihydroxybutyrophenone (THBP).

Among these, preferred are L-ascoribic acid (vitamin C), fatty acid ester of L-ascoribic acid, tocopherol (vitamin E), 2,6-di-tert-butyl-p-cresol (DBPC), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediole (TBHQ), and 2,4,5-trihydroxybutyrophenone (THBP). More preferred are L-ascoribic acid (vitamin C), fatty acid ester of L-ascoribic acid, tocopherol (vitamin E), 2,6-di-tert-butyl-p-cresol (DBPC), and 3,5-di-tert-butyl-4-hydroxyanisole.

No particular limitation is imposed on the content of the oxidation inhibitors. However, in order to maintain an excellent ability to prevent the resulting oil composition from being sticky, the content of the oxidation inhibitor is preferably 0.01 percent by mass or more, more preferably 0.05 percent by mass or more, and most preferably 0.1 percent by mass or more, based on the total mass of the composition. Because no further effect can not be expected, the content is preferably 10 percent by mass or less, more preferably 5 percent by mass or less, and most preferably 3 percent by mass or less, based on the total mass of the composition.

The oil composition according to the present invention contains an ester as the base oil but may further contain the above-described oiliness improvers and/or oxidation inhibitors. If necessary, the oil composition may further contain a base oil and additives, other than those described above, that is, those which have been conventionally used for cutting or grinding oils.

Such a base oil may be a mineral oil and a synthetic oil with the exception of esters. The mineral oil may be paraffinic- or naphthenic-oils produced by subjecting lubricant fractions derived from the atmospheric- or vacuum-distillation of crude oil to the combination of refining processes, such as solvent deasphalting, solvent extraction, hydro-cracking, solvent dewaxing, catalytic dewaxing, hydrodewaxing, hydrorefining, sulfuric acid washing, and clay treatment. Eligible synthetic oils are poly-α-olefins, such as polybutene, 1-octene oligomer, and 1-decene oligomer, alkylbenzenes, alkylnaphthalenes, polyoxyalkylene glycols, and polyphenyl ethers. No particular limitation is imposed on the content of such base oils. However, the content of the base oils is preferably 90 percent by mass or less, more preferably 70 percent by mass or less, and most preferably 50 percent by mass or less, based on the total composition. With the objective of biodegradability, it is preferred that the oil composition of the present invention contains a base oil made up of the ester only (100 percent by mass).

Examples of conventional additives which may be added to the oil composition are chloric-, sulfuric-, phosphoric-, and organic metallic- extreme pressure additives; moisture control additives, such as diethylene glycol monoalkylethers; film forming agents, such as acrylic polymers, paraffin waxes, microwaxes, slack waxes, and polyolefin waxes; water substituting agents, such as fatty acid amine salts; solid lubricants, such as graphite, graphite fluoride, molybdenum disulfide, boron nitride, and polyethylene powder; corrosion inhibitors, such as amines, alkanolamines, amides, carboxylic acids, carboxylates, sulfonates, phosphoric acid, and phosphate; metal deactivators, such as benzotriazole and thiadiazole; antifoamers, such as methylsilicone, fluorosilicone, and polyacrylates; and ashless dispersants, such as alkenylsuccinimides, benzylamines, and polyalkenylamineaminoamide. No particular limitation is imposed on the content of these known additives. However, the additives are generally added such that that total amount thereof is within the range of 0.1 to 10 percent by mass, based on the total mass of the oil composition.

No particular limitation is imposed on the kinematic viscosity of the oil composition of the present invention. Because the resulting oil can be easily supplied to the worked portion of a metal, the upper limit of kinematic viscosity at 40° C. is preferably 200 mm$^2$/s, more preferably 100 mm$^2$/s, even more preferably 75 mm$^2$/s, and most preferably 50 mm$^2$/s, while the lower limit is preferably 1 mm$^2$/s, more preferably 3 mm$^2$/s, and most preferably 5 mm$^2$/s.

BEST MODE FOR CARRYING OUT THE INVENTION

The present invention will be described in more details with reference of inventive examples and comparative examples. However, the present invention is not limited to these examples.

INVENTIVE EXAMPLE 1 AND COMPARATIVE EXAMPLES 1–3

An oil composition of Inventive Example 1 and various oil compositions of Comparative Examples 1 and 2 were prepared by using the followings:

Example 1 an ester of trimethylolpropane and a mixture of n-$C_6$ acid, n-$C_8$ acid, and n-$C_{10}$ acid mixed in a molar ratio of 7:59:34, having a kinematic viscosity at 40° C. of 19.1 cSt.

Comparative Example 1 commercially available water-soluble cutting oil stock solution (specific gravity: 1.04, unvolatile content: 30 mass %) diluted to 20 vol. %, with a surface tension of 36 mN/m, pH=8.6.

Comparative Example 2 commercially available water-insoluble cutting oil with a kinematic viscosity at 40° C. of 7.1 cSt, and chlorine content of 3.6 mass %

A cutting operation was conducted using each of the above oil compositions to measure (1) friction coefficient of tool rake, (2) width in the wear of tool relief, and (3) the maximum roughness of the finished surface. The results are shown in Table 1. The oil composition of Comparative Example 1 was insufflated directly to the worked spot. The rest of the oil composition were supplied to the worked spot in a minimal quantity, together with a large volume of air in the manner described below. As Comparative Example 3, the same measurement was conducted by supplying air only. For reference, the degree of effect to the environment upon the disposal of each of the oil compositions was also shown in Table 1.

Method for Supplying a Minimal Quantity Oil

An oil was supplied to the tip of a cutting tool with an oil-air lubricating unit used in a high-speed bearing lubrication by operating a mixing valve supplying a constant quantity of oil from an oil tank at a predetermined interval of 1 min/shot with a timer so as to discharge the oil to a supplying tube inside of which compressed air flows and mix the oil with the compressed air. Air pressure for discharging the oil was 0.4 MPa, while the compressed air pressure was 0.6 MPa.

(1) Test 1 (the friction coefficient of the tool rake)

Turning operation was conducted under the following conditions, and after 1 second passed, the friction coefficient of tool rake was measured.

Turning Conditions
Material subjected to turning: S45C (carbon steel)
Material of tool: ultra high strength steel (P20)
Cutting speed: 125 m/min
Feed: 0.125 mm/rev
Depth of cut: 1.5 mm (2) Test 2 (width in the wear of the tool relief)

A turning operation was conducted under the following conditions, and after 200 seconds passed, the width (mm) of the wear of the tool relief was measured.

Turning Conditions
Material subjected to turning: SNCM439 (alloy steel)
Material of tool: ultra high strength steel (P20)
Cutting speed: 250 m/min
Feed: 0.25 mm/rev
Depth of cut: 1.0 mm (3) Test 3 (maximum roughness of the finished surface)

A turning operation was conducted under the following conditions, and after 150 seconds passed, the maximum roughness ($\mu$m) of the finished surface was measured.

Turning Conditions
Material subjected to turning: SNCM439 (alloy steel)
Material of tool: ultra high strength steel (P20)
Cutting speed: 250 m/min
Feed: 0.25 mm/rev
Depth of cut: 1.0 mm

TABLE 1

|  | Inventive Example 1 | Comparative Example 1 | Comparative Example 2 | Comparative Example 3 |
|---|---|---|---|---|
| Supply (ml/min) | 0.03 | 4270 | 0.03 | 0 |
| Test 1 | 1.06 | 1.12 | 1.04 | 1.10 |
| Test 2 (mm) | 0.26 | 0.25 | 0.35 | 0.42 |
| Test 3 ($\mu$m) | 13 | 14 | 18 | 23 |
| Effect to the environment | small | large | large | — |

As apparent from the results shown in Table 1, the oil composition according to the present invention gave less influence on the environment and can make the finished surface of the work excellent, that is, smooth, and can improve an ability to prevent the tool from wearing, leading to prolonged tool life.

Whereas, Comparative Example 1 using the commercially available water-soluble cutting oil exerted a greater influence on the environment and was poor in an ability to prevent the tool from wearing. Comparative Example 2 using the commercially available water-insoluble cutting oil exerted a greater influence on the environment and was poor in an ability to prevent the tool from wearing. Comparative Example 3 in which an oil was not used gave a poor finished surface to the work and was poor in an ability to prevent the tool from wearing.

INVENTIVE EXAMPLES 2 TO 9

Various oil compositions shown in Table 2 were prepared using the following synthetic esters and/or natural oils and fats, and subjected to a test for evaluating stickiness and a tapping test for evaluating lubricating properties. The results are shown in Table 2. In the tapping test, only air was insufflated using no oil and this was evaluated as Comparative Example 4. The result was also shown in Table 2.

(Synthetic Ester)
a: triester of trimethylolpropane and a mixture of n-$C_6$ acid, n-$C_8$ acid, and n-$C_{10}$ acid mixed in a molar ratio of 7:59:34
b: tetraester of pentaerythritol and n-$C_8$ acid
c: tetraester of trimethylolpropane and a mixture of n-$C_8$ acid and n-$C_{18}$ acid mixed in a molar ratio of 40:60
d: diester of trimethylolpropane and n-$C_{10}$ acid,
e: diester of pentaerythritol and n-$C_5$ acid (Natural Oils and Fats)
α: commercially available palm kernel oil
β: commercially available lard oil
γ: commercially available rape oil Evaluation of Stickiness 5 ml of each oil composition was placed into an aluminum dish with a size of 100 mm×70 mm and was allowed to stand in a thermostat kept at 70° C., for 336 hours. The stickiness of each oil compositions was then evaluated according to the five-grade system by touching it with fingers. Before and after the test, the mass-average molecular weight of each composition was measured to examine the rate of change with DPC.

The five-grade system of stickiness is as follow:
A: not sticky at all
B: not sticky at all or extremely slightly sticky even though it was felt
C: slightly sticky
D: sticky
E: extremely sticky Evaluation of Lubricity (Tapping Test)

Tapping test was conducted using alternately each oil composition and a comparative standard oil (DIDA: diisodecyl adipionate) under the following conditions. The tapping energy of each oil was measured, and then the tapping energy efficiency was obtained in accordance with the following equation. Higher the tapping energy efficiency is, the higher lubricity is obtained.

Tapping energy efficiency (%)=(tapping energy when using DIDA)/(tapping energy when using the oil composition)

Tapping Conditions
Tool: tap M8 (P=1.25 m)
Hole diameter: Ø7.2 mm
Workpiece: S25C (t=10 mm)
Cutting Speed: 9.0 m/min.
Oil supplying method
Oil compositions: insufflated with a compressed air of 0.2 Mpa at a speed of 25 ml/h.
DIDA: insufflated directly to the work at a speed of 4.3 mL/min. without using compressed air

TABLE 2

|  | Oil Composition | Iodine Value | Bromine Value g Br$_2$/100 g | Hydroxyl group Value mg KOH/g | Saponification Value mg KOH/g | Evaluation of Stickiness | Mn Change Rate % | Tapping Energy Efficiency % |
|---|---|---|---|---|---|---|---|---|
| Inventive Example 2 | a | 0.2 | 0.1 | 2 | 340 | A | 0 | 94 |
| Inventive Example 3 | b | 1 | 1 | 0.5 | 351 | A | 0.1 | 91 |
| Inventive Example 4 | c | 18 | 12 | 3 | 255 | A | 0.2 | 95 |
| Inventive Example 5 | a/γ = 1:1 | 54 | 34 | 2 | 261 | B | 2.5 | 93 |
| Inventive Example 6 | α | 20 | 14 | 1 | 245 | A | 0.5 | 92 |
| Inventive Example 7 | β | 60 | 38 | 4 | 198 | C | 5.5 | 96 |
| Inventive Example 8 | d | 2 | 3 | 130 | 262 | A | 0.3 | 99 |
| Inventive Example 9 | e | 1 | 1 | 363 | 370 | A | 0.7 | 84 |
| Comparative Example 4 | Air only | — | — | — | — | — | — | 80 |

[1])Mn change rate % indicates the rate of change % in mass-average molecular weight
[2])The oil composition (a/γ) of Inventive Example 5 is a mixture by mass ratio.

As apparent from the results shown in Table 2, oil composition comprising an ester having a iodine value and a bromide value within the range of 0 to 80 and 0 to 50 gBR$_2$/100, respectively exhibited low stickiness. It is found that the oil compositions comprising such an ester further having a hydroxyl value within the range of 0.01 to 300 mgKOH/g had also excellent lubricating properties.

INVENTIVE EXAMPLES 10 TO 20

Various oil compositions shown in Table 3 were prepared using the following synthetic esters and/or natural fats and oils, and subjected to a test for evaluating stickiness and a tapping test for evaluating lubricating properties. The results are shown in Table 3. In the tapping test, only air was insufflated using no oil and this was evaluated as Comparative Example 5. The result was also shown in Table 3.

(Synthetic Ester)

a: triester of trimethylolpropane and a mixture of n-C$_6$ acid, n-C$_8$ acid, and n-C$_{10}$ acid mixed in a molar ratio of 7:59:34
b: tetraester of pentaerythritol and n-C$_8$ acid
c: tetraester of trimethylolpropane and a mixture of n-C$_8$ acid and n-C$_{18}$ acid mixed in a molar ratio of 40:60
d: diester of trimethylolpropane and n-C$_{10}$ acid,
f: diester of neopentyl glycol and oleic acid,
g: tetraester of pentaerythritol and oleic acid,
h: monoester of glycerin and oleic acid (hydroxyl value: 315 mgKOH/g, saponification value: 157 mgKOH/g, iodine value: 72, bromine value: 45 gBR$_2$/100 g)

(Natural Fats and Oils)

α: commercially available palm kernel oil
β: commercially available lard oil
γ: commercially available rape oil
σ: commercially available high-oleic sunflower oil Evaluation of Lubricity (Tapping Test)

Tapping test was conducted using alternately each oil composition and a comparative standard oil (DIDA: diisodecyl adipionate) under the following conditions. The tapping energy of each oil was measured, and then the tapping energy efficiency was obtained in accordance with the following equation. Higher the tapping energy efficiency is, the higher lubricity is obtained.

Tapping energy efficiency (%)=(tapping energy when using DIDA)/(tapping energy when using the oil composition)

Tapping Conditions

Tool: tap M8 (P=1.25 m)
Hole diameter: Ø6.8 mm
Workpiece: S25C (t=10 mm)
Cutting Speed: 9.0 m/min.

Oil supplying method

Oil compositions: insufflated with a compressed air of 0.2 Mpa at a speed of 25 ml/h.
DIDA: insufflated directly to the work at a speed of 4.3 mL/min without using compressed air Evaluation of Stickiness 5 ml of each oil composition was placed into an aluminum dish with a size of 100 mm×70 mm and was allowed to stand in a thermostat kept at 70° C. for 168 hours. The stickiness of each oil compositions was then evaluated according to the five-grade system by touching it with fingers. Before and after the test, the mass-average molecular weight of each composition was measured to examine the rate of change with DPC.

The five-grade system of stickiness is as follow:

A: not sticky at all
B: not sticky at all or extremely slightly sticky even though it was felt
C: slightly sticky
D: sticky
E: extremely sticky

TABLE 3

|  | Oil Composition | Hydroxyl group Value mg KOH/g | Saponification Value mg KOH/g | Iodine Value | Bromine Value g Br$_2$/100 g | Tapping Energy Efficiency % | Evaluation of Stickiness | Mn Change Rate % |
|---|---|---|---|---|---|---|---|---|
| Inventive Example 10 | a | 2 | 340 | 0.2 | 0.1 | 90 | A | 0 |
| Inventive Example 11 | b | 0.5 | 351 | 1 | 1 | 89 | A | 0 |
| Inventive Example 12 | c | 3 | 255 | 18 | 12 | 92 | A | 0.2 |
| Inventive Example 13 | a/γ = 1:1 | 2 | 261 | 54 | 34 | 90 | B | 2.1 |

TABLE 3-continued

| | Oil Composition | Hydroxyl group Value mg KOH/g | Saponification Value mg KOH/g | Iodine Value | Bromine Value g Br$_2$/100 g | Tapping Energy Efficiency % | Evaluation of Stickiness | Mn Change Rate % |
|---|---|---|---|---|---|---|---|---|
| Inventive Example 14 | α | 1 | 245 | 20 | 14 | 89 | A | 0.3 |
| Inventive Example 15 | β | 4 | 198 | 60 | 38 | 93 | B | 2.9 |
| Inventive Example 16 | f | 3 | 177 | 85 | 55 | 93 | B | 3.8 |
| Inventive Example 17 | δ | 1 | 190 | 87 | 57 | 90 | B | 4.2 |
| Inventive Example 18 | d | 130 | 262 | 2 | 3 | 95 | A | 0.5 |
| Inventive Example 19 | g | 1 | 188 | 84 | 55 | 90 | B | 4.9 |
| Inventive Example 20 | a/h = 9:1 | 35 | 348 | 11 | 8 | 95 | A | 0.3 |
| Comparative Example 5 | Air only | — | — | — | — | 74 | — | — |

[3] Mn change rate % indicates the rate of change % in mass-average molecular weight
[4] The oil compositions (a/γ, a/h) of Inventive Examples 13 and 20 are mixtures by mass ratio.

As apparent from the results shown in Table 2, the oil compositions comprising an ester having a hydroxyl value within the range of 0.01 to 300 mgKOH/g exhibits enhanced lubricating properties. The oil compositions comprising the ester having an iodine value and a bromine value within the range of 0 to 80 and 0 to 50 gBR$_2$/100, respectively also exhibited low stickiness. The oil composition comprising two different esters and adjusted so as to have a hydroxyl value of 0.01 to 300 mgKOH/g exhibited enhanced lubricating properties.

INVENTIVE EXAMPLES 21 TO 40 AND REFERENCE EXAMPLES 1 AND 2

Various oil compositions were prepared using the ester described below as a base oil, oiliness improvers, and oxidation inhibitors in accordance with the formulations shown in Tables 4 and 5. The evaluation of lubricating properties by tapping test and stickiness of each oil composition were conducted, with the results shown in Tables 4 and 5.

Table 4 shows Inventive Examples 21 to 40 and Reference Example 1, all of which use synthetic ester a as a base oil. Reference Example 1 is an oil composition comprises only synthetic ester a.

Table 5 shows Inventive Examples 21 to 40 and Reference Example 2, all of which use natural fats and oils ester γ as a base oil. Reference Example 2 is an oil composition comprises only natural fats and oils ester γ.

The case where only air was insufflated was also evaluated as Comparative Example 6. The results are also shown in Table 4.

Evaluation of Lubricating Properties (Tapping Test)

Tapping test was conducted using alternately each oil composition and a comparative standard oil (DIDA: diisodecyl adipionate) under the following conditions. The tapping energy of each oil was measured, and then the tapping energy efficiency was obtained in accordance with the following equation. Higher the tapping energy efficiency is, the higher lubricity is obtained.

Tapping energy efficiency (%)=(tapping energy when using DIDA)/(tapping energy when using the oil composition)

Tapping Conditions

Tool: tap M8 (P=1.25 m)

Hole diameter: Ø6.8 mm

Workpiece: S25C (t=10 mm)

Cutting Speed: 9.0 m/min.

Oil supplying method

Oil compositions: insufflated with a compressed air of 0.2 Mpa at a speed of 25 ml/h.

DIDA: insufflated directly to the work at a speed of 4.3 mL/min without using compressed air Evaluation of Stickiness 5 ml of each oil composition was placed into an aluminum dish with a size of 100 mm×70 mm and was allowed to stand in a thermostat kept at 70° C., for 168 hours. The stickiness of each oil compositions was then evaluated according to the five-grade system by touching it with fingers. Before and after the test, the mass-average molecular weight of each composition was measured to examine the rate of change with DPC.

The five-grade system of stickiness is as follow:

A: not sticky at all

B: not sticky at all or extremely slightly sticky even though it was felt

C: slightly sticky

D: sticky

E: extremely sticky

TABLE 4

Synthetic ester a[5] is used as a base oil

| | Oiliness Improvers | | Oxidation Inhibitor (mass %) | Tapping Energy Efficiency % | Evaluation of Stickiness | Mn Change Rate %[6] |
|---|---|---|---|---|---|---|
| | Type | Amount (mass %) | | | | |
| Inventive Example 21 | n-dodecanol | 10 | — | 104 | A | 0.1 |
| Inventive Example 22 | Oleic alcohol | 10 | — | 101 | A | 1.8 |
| Inventive Example 23 | Oleic acid sulfide | 5 | — | 98 | A | 1.7 |
| Inventive Example 24 | Oleic acid | 10 | — | 106 | B | 2.3 |

TABLE 4-continued

Synthetic ester a[5] is used as a base oil

| | Oiliness Improvers | | Oxidation | | | |
|---|---|---|---|---|---|---|
| | Type | Amount (mass %) | Inhibitor (mass %) | Tapping Energy Efficiency % | Evaluation of Stickiness | Mn Change Rate %[6] |
| Inventive Example 25 | Polypropylene glycol monobutylether | 10 | — | 99 | A | 0.1 |
| Inventive Example 26 | 2,2-dihydroxy naphthalene | 0.1 | — | 99 | A | 0 |
| Inventive Example 27 | 2,3-dihydroxy naphthalene | 1 | — | 105 | A | 0 |
| Inventive Example 28 | p-t-butyl catechol | 1 | — | 103 | A | 0.1 |
| Inventive Example 29 | n-dodecanol | 10 | Vitamine E (1) | 103 | A | 0.1 |
| Inventive Example 30 | n-dodecanol | 10 | DBPC (1) | 101 | A | 0.1 |
| Reference Example 1[7] | — | — | — | 90 | A | 0 |
| Comparative Example 6[8] | — | — | — | 74 | — | — |

[5]synthetic ester a: triester of trimethylolpropane and a mixture of n-$C_6$ acid, n-$C_8$ acid, and n-$C_{10}$ acid mixed in a molar ratio of 7:59:34 (iodine value: 0.2, bromine value: 0.1 g $BR_2$/100 g, hydroxyl value: 2 mg KOH/g, saponification value: 340 mg KOH/g)
[6]Mn change rate % indicates the rate of change % in mass-average molecular weight
[7]Reference Example 1 is an example of an oil composition comprising only synthetic ester a only.
[8]Comparative Example 6 is an example in which only air was insufflated using no oil composition.

TABLE 5

Natural fats and oils γ[9] is used as a base oil

| | Oiliness Improvers | | Oxidation | | | |
|---|---|---|---|---|---|---|
| | Type | Amount (mass %) | Inhibitor (mass %) | Tapping Energy Efficiency % | Evaluation of Stickiness | Mn Change Rate %[10] |
| Inventive Example 31 | n-dodecanol | 10 | — | 104 | B | 4.1 |
| Inventive Example 32 | Oleic alcohol | 10 | — | 103 | C | 8.2 |
| Inventive Example 33 | Oleic acid sulfide | 5 | — | 101 | C | 8.8 |
| Inventive Example 34 | Oleic acid | 10 | — | 101 | C | 9.1 |
| Inventive Example 35 | Polypropylene glycol monobutylether | 10 | — | 98 | B | 4.8 |
| Inventive Example 36 | 2,2-dihydroxy naphthalene | 0.1 | — | 98 | B | 4.5 |
| Inventive Example 37 | 2,3-dihydroxy naphthalene | 1 | — | 104 | B | 3.7 |
| Inventive Example 38 | p-t-butyl catechol | 1 | — | 102 | B | 3.9 |
| Inventive Example 39 | n-dodecanol | 10 | Vitamine E (1) | 102 | A | 1.2 |
| Inventive Example 40 | n-dodecanol | 10 | DBPC (1) | 102 | A | 1.7 |
| Reference Example 2[11] | — | — | — | 92 | C | 7.9 |
| Comparative Example 6[12] | — | — | — | 74 | — | — |

[9]natural oils and fats γ: commercially available rape oil (iodine value: 114, bromine value: 73 g $BR_2$/100 g, hydroxyl value: 3 mg KOH/g, saponification value: 173 mg KOH/g)
[10]Mn change rate % indicates the rate of change % in mass-average molecular weight
[11]Reference Example 2 is an examples of an oil composition comprising natural fats and oils only
[13]Reference Example 6 is an example in which only air was insufflated using no oil composition.

As apparent from the results shown in Tables 4 and 5, the oil compositions according to the present invention, that is, Inventive Examples 21 to 40 exhibited higher lubricating properties and lower stickiness, compared with the oil compositions of Reference Examples 1 and 2 each comprising an ester (synthetic ester in Table 4, natural fats and oils in Table 5) as a base oil. The oil compositions each further comprising an oxidation inhibitor, that is, Inventive Examples 39 and 40 is further reduced in stickiness.

INVENTIVE EXAMPLES 41 TO 56 AND REFERENCE EXAMPLE 3

Various oil compositions were prepared using ester γ (natural fats and oils) and synthetic ester a as a base oil, and oxidation inhibitors in accordance with the formulation shown in Table 6. The stickiness of each oil composition was evaluated. The results are shown in Table 6. An oil composition comprising only ester γ (natural fats and oils) as a base oil was also evaluated. The results are also shown in Table 6.

Evaluation of Stickiness 5 ml of each oil composition was placed into an aluminum dish with a size of 100 mm×70 mm and was allowed to stand in a thermostat kept at 70° C. for one month. The stickiness of each oil compositions was then evaluated according to the five-grade system by touching it with fingers. Before and after the test, the mass-average molecular weight of each composition was measured to examine the rate of change with DPC.

The five-grade system of stickiness is as follow:

A: not sticky at all

B: not sticky at all or extremely slightly sticky even though it was felt

C: slightly sticky

D: sticky

E: extremely sticky

TABLE 6

| | Base Oil | Oxidation Inhibitor Type | Amount (mass %) | Evaluation of Stickiness | Mn Change Rate % |
|---|---|---|---|---|---|
| Inventive Example 41 | γ[13] | DBPC | 0.1 | C | 6.8 |
| Inventive Example 42 | γ | DBPC | 1 | B | 4.1 |
| Inventive Example 43 | γ | DBPC | 10 | A | 0.8 |
| Inventive Example 44 | γ | 2,6-di-t-butyl-4-hydroxyanisole | 0.1 | C | 8.2 |
| Inventive Example 45 | γ | 2,6-di-t-butyl-5-hydroxyanisole | 1 | A | 1.1 |
| Inventive Example 46 | γ | Vitamine C | 0.1 | C | 7.5 |
| Inventive Example 47 | γ | Vitamine C | 1 | A | 1.9 |
| Inventive Example 48 | γ | Fatty acid ester of ascorbic acid | 0.1 | C | 6.8 |
| Inventive Example 49 | γ | Fatty acid ester of ascorbic acid | 1 | A | 1.4 |
| Inventive Example 50 | γ | Vitamine E | 0.1 | C | 7.1 |
| Inventive Example 51 | γ | Vitamine E | 1 | A | 0.9 |
| Inventive Example 52 | a[14] | Vitamine E | 10 | A | 0.5 |
| Inventive Example 53 | a | DBPC | 0.1 | A | 0.3 |
| Inventive Example 54 | a | DBPC | 1 | A | 0.2 |
| Inventive Example 55 | a | Vitamine E | 0.1 | A | 0.3 |
| Inventive Example 56 | a | Vitamine E | 1 | A | 0.1 |
| Inventive Example 57 | a/h = 9/1[15] (mixing mass ratio) | Vitamine E | 0.1 | A | 1.4 |
| Inventive Example 58 | a/h = 9/1[15] (mixing mass ratio) | Vitamine E | 1 | A | 0.5 |
| Reference Example 3[16] | γ | — | — | E | 75.1 |

[13] γ (natural fats and oils): commercially available rape oil (iodine value: 114, bromine value: 73 g BR$_2$/100 g, hydroxyl value: 3 mg KOH/g, saponification value: 173 mg KOH/g)
[14] a (synthetic ester): triester of trimethylolpropane and a mixture of n-C$_6$ acid, n-C$_8$ acid, and n-C$_{10}$ acid mixed in a molar ratio of 7:59:34 (iodine value 0.2, bromine number: 0.1 g BR$_2$/100 g, hydroxyl value: 2 mg KOH/g, saponification value: 340 mg KOH/g)
[15] h (synthetic ester): monoester of glycerin and oleic acid iodine value: 72, bromine number: 45 g BR$_2$/100 g, hydroxyl value: 315 mg KOH/g, saponification value: 157 mg KOH/g)
[16] an oil composition comprising natural fats and oils γ only
[17] Mn change rate indicates change rate in mass-average molecular weight As apparent from the results shown in Table 6, oil compositions comprising an ester as a base oil and an oxidation inhibitor (Inventive Examples 41 to 58) are hard to be sticky, compared with Reference Example 3 which comprises an ester used as a base oil only.

APPLICABILITY IN THE INDUSTRY

The use of an ester as a base oil can provide a cutting or grinding oil composition which is suitable for a minimal lubrication system in which a minimal amount of oil composition is supplied to the spot to be cut or ground of a work, together with a fluid, such as air. Particularly the use of an ester having an iodine value and/or a bromine value within the specific ranges can improve the stickiness of the oil composition, and thus avoid the deterioration of treatability of tools to which the oil composition is adhered and the deterioration of workability caused thereby. Furthermore, the use of an ester having a hydroxyl value and/or a saponification value within the specific ranges can provide an oil composition with increased lubricity, and thus makes it possible to conduct cutting or grinding operation efficiently.

The addition of oiliness improvers to an ester as a base oil can provide an oil composition which is further enhanced in lubricating properties. In this case, the use of an ester having a hydroxyl value and a saponification value within the specific ranges can provide an oil composition which is further enhanced in lubricating properties. Furthermore, the use of an ester having an iodine value and a bromine value within the specific range can improve stickiness as well as lubricating properties.

The addition of oxidation inhibitors to an ester as a base oil can provide an oil composition which is hard to be sticky. In this case, the use oiliness improvers in combination can provide an oil composition which is improved in lubricating properties and stickiness. In such a case, the use of an ester having a hydroxyl value, a saponification value, an iodine value, and a bromine value within the specific ranges can provide an oil composition which has excellent lubricating properties and a reduced stickiness.

What is claimed is:

1. A cutting or grinding oil composition for a minimal quantity lubrication system comprising 20 to 100 percent by mass of an ester, 0 to 50 percent by mass of an oiliness improver, 0 to 10 percent by mass of an oxidation inhibitor, and 0 to 70 percent by mass of a base oil based on a total mass of the composition, wherein the composition has a kinematic viscosity of 1 to 100 mm$^2$/s at 40° C., and wherein said ester comprises a polyhydric alcohol selected from the group consisting of those of from dihydric- to decahydric- alcohols and a fatty acid having 2 to 24 carbon atoms.

2. The oil composition according to claim 1 wherein said ester has an iodine value of 0 to 80.

3. The oil composition according to claim 1 wherein said ester has a bromine value of 0 to 50 gBr$_2$/100 g.

4. The oil composition according to claim 1 wherein said ester has a hydroxyl value of 0.01 to 300 mgKOH/g.

5. The oil composition according to claim 1 wherein said ester has a saponification value of 100 to 500 mgKOH/g.

6. The oil composition according to claim 1 wherein said ester is a synthetic ester.

7. The oil composition according to claim 1, wherein said oiliness improver is selected from the group consisting of (A) alcohols, (B) carboxylic acids, (C) sulfides of unsaturated carboxylic acids, (D) compounds represented by formula (1) given below, (E) compounds represented by formula (2) given below, (F) polyoxyalkylene compounds, and (G) esters; said formula (1) being represented by the formula

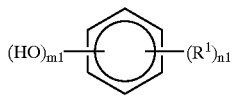

(1)

wherein R¹ is a hydrocarbon group having 1 to 30 carbon atoms, m1 is an integer from 1 to 6, and n1 is an integer from 0 to 5; and said formula (2) being represented by the formula

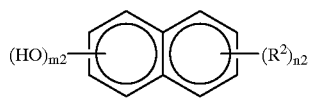

(2)

wherein R² is a hydrocarbon group having 1 to 30 carbon atoms, m2 is an integer from 1 to 6, and n2 is an integer from 0 to 5.

8. The oil composition according to claim 1, wherein said oiliness improver is contained in an amount of 0.1 to 50 percent by mass, based on the total mass of the composition.

9. The oil composition according to claim 1, wherein said oxidation inhibitor is one or more compounds selected from the group consisting of L-ascorbic acid (vitamin C), fatty acid ester of L-ascorbic acid, tocopherol (vitamin E), 2,6-di-tert-butyl-p-cresol (DBPC), and 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediole (TBHQ), and 2,4,5-trihydroxybutyrophenone (THBP).

10. The oil composition according to claim 1, wherein said oxidation inhibitor is one or more compounds selected from the group consisting of L-ascorbic acid (vitamin C), fatty acid ester of L-ascorbic acid, tocopherol (vitamin E), 2,6-di-tert-butyl-p-cresol (DBPC), and 3,5-di-tert-butyl-4-hydroxyanisole.

11. The oil composition according to claim 1, wherein said oxidation inhibitor is contained in an amount of 0.1 to 10 percent by mass, based on the total mass of the composition.

12. A minimal quantity lubrication system for cutting or grinding which comprises supplying together with a compressed fluid an oil composition in a quantity of 0.001 ml/minute to 1 ml/minute to the cutting or grinding spot of a work, wherein the oil composition comprises 20 to 100 percent by mass of an ester, 0 to 50 percent by mass of an oiliness improver, 0 to 10 percent by mass of an oxidation inhibitor, and 0 to 70 percent by mass of a base oil based on a total mass of the composition, and the composition has a kinematic viscosity of 1 to 100 mm²/s at 40° C.

13. The cutting or grinding oil composition according to claim 1, wherein said ester is contained in an amount of at least 30 percent by mass based on the total mass of the composition.

14. The cutting or grinding oil composition according to claim 1, wherein said ester is contained in an amount of at least 50 percent by mass based on the total mass of the composition.

15. A method for cutting or grinding a work which comprises:

(a) cutting or grinding a work such that the work has a cutting or grinding spot; and (b) supplying to the cutting or grinding spot of the work an oil composition from a minimal quantity lubrication system wherein the minimal quantity lubrication system comprises supplying together with a compressed fluid the oil composition in a quantity of 0.001 ml/minute to 1 ml/minute; wherein the oil composition comprises 20 to 100 percent by mass of an ester, 0 to 50 percent by mass of an oiliness improver, 0 to 10 percent by mass of an oxidation inhibitor, and 0 to 70 percent by mass of a base oil based on a total mass of the composition, and wherein the composition has a kinematic viscosity of 1 to 100 mm²/s at 40° C.

16. The cutting or grinding oil composition according to claim 1, wherein said ester is an ester of a polyhydric alcohol and a monobasic acid, and said polyhydric alcohol is a dihydric to decahydric alcohol selected from the group consisting of ethylene glycol, diethylene glycol, propylene glycol, dipropylene glycol, 1,3-propane diol, 1,2-propane diol, 1,3-butane diol, 1,4-butane diol, 2-methyl-1,2-propane diol, 2-methyl-1,3-propane diol, 1,2-pentane diol, 1,3-pentane diol, 1,4-pentane diol, 1,5-pentane diol, neopentyl glycol, glycerin, polyglycerin, trimethylolalkane and dimers through tetramers thereof, pentaerythritol and dimers through tetramers thereof, 1,2,4-butane triol, 1,3,5-pentane triol, 1,2,6-hexane trial, 1,2,3,4-butanetetrol, sorbitol, sorbitan, sorbitol glycerin condensation products, adonitol, arabitol, xylytol, mannitol, and saccharides.

17. The cuffing or grinding oil composition according to claim 1, wherein said ester is an ester of polyhydric alcohol and a monobasic acid, and said polyhydric alcohol is a dihydric to hexahydric alcohol selected from the group consisting of ethylene glycol, diethylene glycol, propylene glycol, dipropylene glycol, 1,3-propane diol, 2-methyl-1,2-propane diol, 2-methyl-1,3-propane diol, neopentyl glycol, glycerin, diglycerin, triglycerin, trimethylolalkane and dimers through tetramers thereof, pentaerythritol, dipentaerythritol, 1,2,4-butane triol, 1,3,5-pentane triol, 1,2,6-hexane triol, 1,2,3,4-butane tetrol, sorbitol, sorbitan, sorbitol glycerin condensation products, adonitol, arabitol, xylytol and mannitol.

18. The cutting or grinding oil composition according to claim 1, wherein said ester is an ester of a polyhydric alcohol and a monobasic acid, and said polyhydric alcohol is a dihydric to hexahydric alcohol selected from the group consisting of ethylene glycol, propylene glycol, neopentyl glycol, glycerin, trimethylol ethane, trimethylol propane, pentaerythritol and sorbitan.

19. The cutting or grinding oil composition according to claim 1, further comprising at least one additive selected from the group consisting of an extreme pressure additive, a moisture control additive, a film forming agent, a water substituting agent, a corrosion inhibitor, a metal deactivator, an antifoamer, and an ashless dispersant.

* * * * *